UNITED STATES PATENT OFFICE.

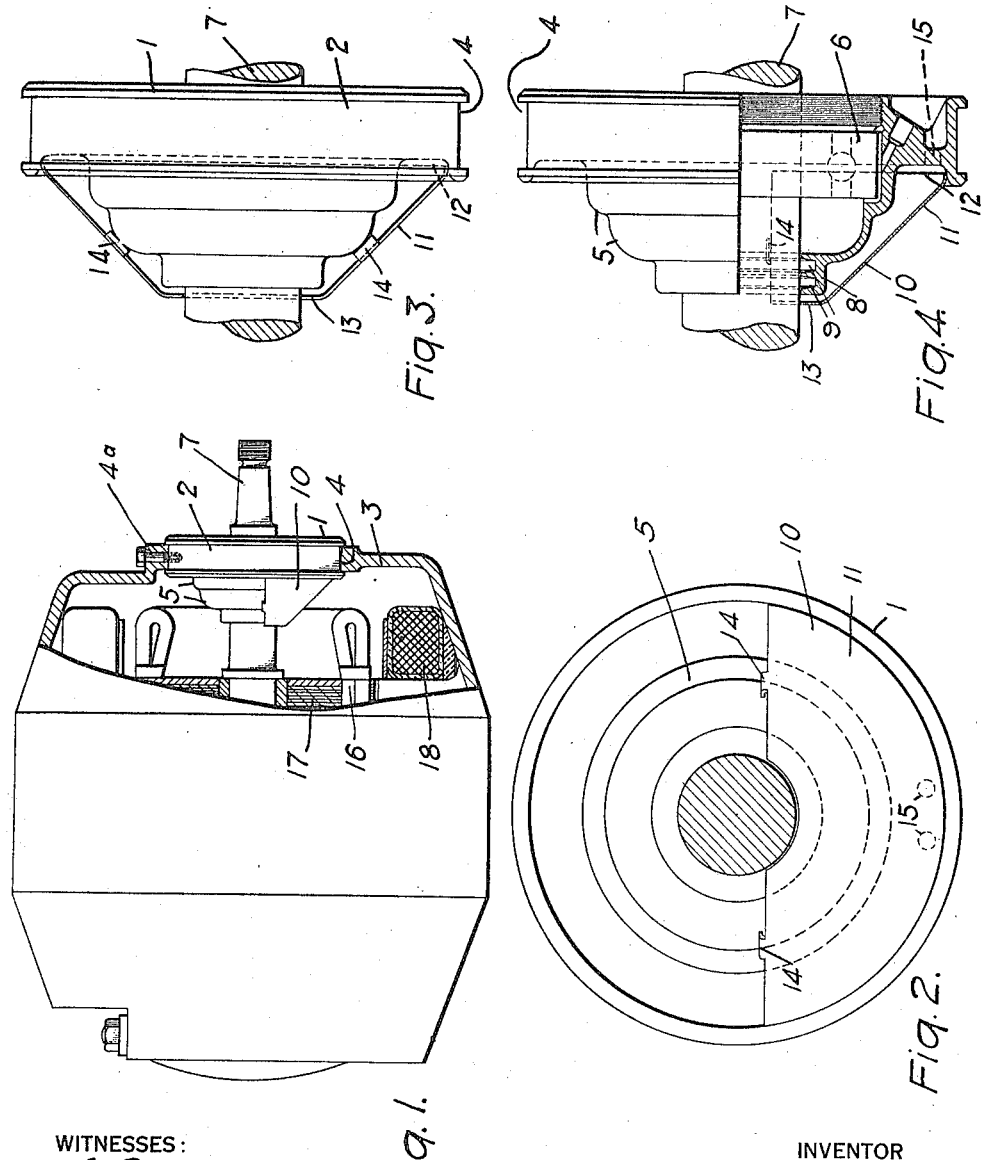

EDWIN G. TIDLUND, OF PITTSBURGH, PENNSYLVANIA, ASSIGNOR TO WESTINGHOUSE ELECTRIC AND MANUFACTURING COMPANY, A CORPORATION OF PENNSYLVANIA.

BEARING-HOUSING.

1,221,108.  Specification of Letters Patent.  Patented Apr. 3, 1917.

Application filed July 6, 1915. Serial No. 38,175.

*To all whom it may concern:*

Be it known that I, EDWIN G. TIDLUND, a subject of the King of Sweden, and a resident of Pittsburgh, in the county of Allegheny and State of Pennsylvania, have invented a new and useful Improvement in Bearing-Housings, of which the following is a specification.

My invention relates to guard members for bearing housings and it has for its object to provide a means for preventing the lubricating fluid that escapes from bearing housings from coming into contact with machine parts located adjacent thereto.

By my invention, I provide a guard member that is simple and inexpensive in construction and that may be formed entirely from pressed metal. Furthermore, I provide a guard member that is particularly adapted to be applied to cast bearing housings used in connection with dynamo-electric machines wherein the available space between the bearing housings and the machine parts is so limited that it is not possible to have the oil guards cast integral with the housing members.

In the accompanying drawings, Figure 1 is a view, in side elevation, of a dynamo-electric machine, with parts broken away to show my invention applied thereto; Fig. 2 is a view, in front elevation, of a bearing housing provided with a guard member constructed in accordance with my invention; Fig. 3 is a plan view of the parts shown in Fig. 1, and Fig. 4 is a view, partially in section and partially in side elevation, of the parts shown in Fig. 2.

A bearing housing 1 comprises an annular portion 2 that is adapted to be mounted on the frame 3 of a dynamo-electric machine by means of a suitable groove 4 provided in its periphery and is secured by a retaining bolt 4ª. The portion 2 is further provided with a plurality of concentric and substantially bell-shaped extensions 5 that are adapted to receive suitable bearing members 6 which rotatably support a shaft 7 within the bearing housing 1. The portion 2 terminates in a cylindrical extension 8 that is provided with a plurality of annular grooves 9 surrounding the shaft 7. A guard member 10 is preferably formed from a single piece of sheet metal and comprises a semi-frusto-conical portion 11, one end of which is bent over and is adapted to fit closely within an annular recess 12 provided in the member 2. A substantially semi-annular flange 13 is formed at the other end of the portion 11 and is adapted to partially inclose the shaft 7. The inclined edges of the semi-frusto-conical portion 11 are provided with inwardly extending ears or lugs 14 at points intermediate the inner and outer ends thereof. The ears 14 are adapted to engage the left-hand extension 5, as best shown in Figs. 2 and 3. The guard member 10 is suitably welded or otherwise secured to the bearing member 2 along the line of contact between its outer end and the outer wall of the annular recess 12 and at the points where the ears 14 engage the extension 5. Openings 15 are provided in the wall of the annular member 2 at points adjacent the recess 12.

From the foregoing, it is apparent that lubricating fluid escaping from the bearing housing will be first collected by the grooves 9 of the cylindrical extension 8 and will overflow into the inclosing portions of the guard member 10. In this way, the lubricating fluid will be prevented from creeping along the shaft 7 and coming into contact with the windings 16 of the armature member 17 carried thereby and will also be prevented from dropping upon the stationary field-magnet windings 18 that are located within the frame 3 of the dynamo-electric machine. The lubricating fluid that is collected within the guard member will be discharged through the overflow openings 15.

While I have shown my invention in a simple and preferred form and as applied to a particular type of bearing housing, it is not so limited but is susceptible of various minor changes and modifications within the scope of the appended claims.

I claim as my invention:

1. A guard member for bearing housings comprising a semi-frusto-conical portion terminating at one end in a substantially semi-annular flange.

2. A pressed metal guard member for bearing housings comprising a semi-frusto-conical portion terminating at one end in a substantially semi-annular flange, the plane of which is at right angles to the axis of the said semi-frusto-conical portion.

3. A guard member for bearing housings comprising a semi-frusto-conical portion provided with inwardly extending ears upon the inclined edges thereof.

4. A guard member for bearing housings comprising a semi-frusto-conical portion provided with inwardly extending ears upon the edges thereof and terminating at one end in a substantially semi-annular flange.

5. The combination with a shaft and a bearing housing therefor comprising an annular supporting member and a plurality of concentric extensions integral therewith, of a guard member partially inclosing the said shaft and the said extensions and in engagement with the said annular supporting member and the said extensions.

6. The combination with a shaft and a bearing housing therefor comprising an annular supporting member and a plurality of concentric extensions integral therewith, of a semi-frusto-conical guard member partially inclosing the said extensions and having its outer end in engagement with the said annular supporting member.

7. The combination with a shaft and a bearing housing therefor comprising an annular supporting member and a plurality of concentric extensions integral therewith, of a semi-frusto-conical guard member inclosing the said extensions and provided with inwardly extending ears upon its edges to engage the said extensions.

8. The combination with a shaft and a bearing housing therefor comprising an annular supporting member and a plurality of concentric extensions integral therewith, of a semi-frusto-conical guard member terminating at one end in a substantially annular flange and partially inclosing the said shaft and the said extensions.

9. The combination with a shaft and a bearing housing therefor comprising an annular supporting member and a plurality of concentric extensions integral therewith, of a semi-frusto-conical guard member inclosing the said extensions and provided with inwardly extending ears upon its edges to engage the said extensions, the outer end of the said guard member being in engagement with the said annular supporting member.

10. The combination with a shaft and a bearing housing therefor comprising an annular supporting member and a plurality of concentric extensions integral therewith, of a semi-frusto-conical guard member partially inclosing the said extensions and provided with inwardly extending ears upon its edges which are welded to the said extensions, the outer end of the said guard member being welded to the said annular supporting member.

11. The combination with a shaft and a bearing housing therefor comprising an annular supporting member and a plurality of concentric extensions integral therewith, the said annular member having a plurality of openings extending through the wall thereof, of a guard member partially inclosing the said shaft and the said extensions and in engagement with the said supporting member adjacent to said openings.

In testimony whereof, I have hereunto subscribed my name this 26th day of June 1915.

EDWIN G. TIDLUND.

Copies of this patent may be obtained for five cents each, by addressing the "Commissioner of Patents, Washington, D. C."